United States Patent [19]
Gil

[11] Patent Number: 6,035,888
[45] Date of Patent: Mar. 14, 2000

[54] FILL VALVE

[75] Inventor: Amos Gil, Farmington Hills, Mich.

[73] Assignee: Brass-Craft Manufacturing Company, Novi, Germany

[21] Appl. No.: 09/005,633

[22] Filed: Jan. 9, 1998

[51] Int. Cl.[7] .......................... F16K 31/26; F16K 31/34; F16K 31/36
[52] U.S. Cl. .......................... 137/413; 137/422; 137/443
[58] Field of Search .................. 137/412, 413, 137/414, 434, 442, 443, 444, 422

[56] References Cited

U.S. PATENT DOCUMENTS

| | | | |
|---|---|---|---|
| 487,671 | 12/1892 | Hunter | 137/437 |
| 638,740 | 12/1899 | Morrison | 137/422 |
| 643,906 | 2/1900 | Marsh | 137/413 |
| 674,276 | 5/1901 | Moore et al. | 251/144 |
| 930,454 | 8/1909 | Bernesser | 137/443 |
| 966,442 | 8/1910 | Hoffman | 417/182.5 |
| 1,302,538 | 5/1919 | Gulick | 137/413 |
| 1,397,591 | 11/1921 | Lauritsen | 137/413 |
| 1,711,782 | 5/1929 | Hamaker | 137/436 |
| 1,804,093 | 5/1931 | Estep | 137/443 |
| 1,903,816 | 4/1933 | Hanson et al. | 137/436 |
| 2,588,242 | 3/1952 | Hunter | 137/414 |
| 2,731,030 | 1/1956 | Phillips et al. | 137/413 |
| 2,735,442 | 2/1956 | Kenney | 137/413 |
| 2,775,258 | 12/1956 | Fraser | 137/413 |
| 2,799,290 | 7/1957 | Svirsky | 137/414 |
| 2,811,169 | 10/1957 | Buchanan | 137/414 |
| 3,036,591 | 5/1962 | Eddowes | 137/426 |
| 3,115,153 | 12/1963 | Delamater | 137/413 |
| 3,147,771 | 9/1964 | Elbogen et al. | 137/413 |
| 3,593,740 | 7/1971 | Harrison et al. | 137/411 |
| 3,625,264 | 12/1971 | Swain | 137/413 |
| 5,072,751 | 12/1991 | Lin | 137/429 |

FOREIGN PATENT DOCUMENTS

| | | | |
|---|---|---|---|
| 63405 | 3/1925 | Germany | 137/413 |
| 0188674 | 9/1985 | Japan | 137/413 |

*Primary Examiner*—George L. Walton
*Attorney, Agent, or Firm*—Edgar A. Zarins; Lloyd D. Doigan

[57] ABSTRACT

A fill valve for controlling the filling of a fluid reservoir such as a cistern. The valve minimizes the time needed to fill the reservoir by maintaining maximum fluid flow through the valve until instantaneous shut off of the fill valve once the reservoir is filled. The fill valve includes a reciprocating valve head carried on a valve stem connected to a float arm for determining the fluid level within the reservoir. The valve head is disposed within an enclosure having grooves for conducting fluid flow past the valve head to create a back pressure behind the valve head. The valve stem seals a passageway through the valve head which operates as a pilot valve during opening and closing of the valve.

16 Claims, 5 Drawing Sheets

FILL VALVE

FIELD OF THE INVENTION

The present invention relates to fill valves and in particular, a pilot operated cistern valve which facilitates the flow of fluids into a reservoir with instantaneous shut-off as the float is elevated.

BACKGROUND OF THE INVENTION

Float operated cistern tank fill valves are known. However, conventional fill valves suffer from several disadvantages. Cistern fill valves are typically utilized to control the filling of water supply reservoirs or receptacles which receive water from a municipal supply. In many instances, the cistern may only be filled during a specific time period requiring that the reservoir be filled as quickly as possible. One drawback of the prior known fill valves is the tendency to throttle-down the fluid flow as the float approaches the fill line. This can substantially increase the time needed to completely fill the cistern particularly in tanks with a large surface area.

SUMMARY OF THE PRESENT INVENTION

The present invention overcomes the disadvantages of the prior known fill valves by providing a combination hydraulic and mechanical fill valve for efficiently filling a reservoir such as a cistern in a short period of time.

The fill valve of the present invention is intended to control the filling of a fluid reservoir as quickly and efficiently as possible by combining hydraulic and mechanical features into the valve. The fill valve includes a housing with an inlet and an outlet within which the valve components are housed. Disposed within the housing is a flow control enclosure having a substantially tubular configuration with an outer diameter less than the inner diameter of the housing to facilitate fluid flow past the enclosure to flow ports formed in the enclosure. Formed on the interior surface of the enclosure is at least one pilot groove. Reciprocally disposed within the enclosure and valve housing is a valve assembly including an axial valve stem and a valve head movably mounted to the valve stem. The valve stem is mechanically connected to a float arm for actuation in accordance with fluid levels in the reservoir. An elongated head portion of the valve stem cooperates with the valve head to selectively close an axial passageway of the valve head. The valve head includes a sealing disc which cooperates with the inner surface of the enclosure and the valve housing to control flow and an elongated nose extending towards the valve outlet and forming the axial passageway.

With the float arm raised, the valve stem and valve head are pulled to a closed position within the valve housing preventing fluid flow therethrough. However, the longitudinal grooves formed in the inner surface of the enclosure allow fluid seepage past the valve head in order to build-up fluid pressure behind the valve head within the enclosure. When the water level within the reservoir drops, the float and float arm will lower moving the stem head away from the valve head reducing pressure on one side of the valve head. This drop in pressure reverses the net force applied to the valve head causing the valve head to move away from the seat allowing full flow through the valve. As the float arm is raised, any mechanical tension applied to the valve stem will be released, allowing pressure differentials on opposite sides of the valve head to almost instantaneously close the valve once the reservoir has been filled to a predetermined level. Thus, the fill valve of the present invention utilizes a combination of mechanical and hydraulic systems to control flow through the valve.

Other objects, features and advantages of the invention will be apparent from the following detailed description taken in connection with the accompanying drawings.

BRIEF DESCRIPTION OF THE DRAWING

The present invention will be more fully understood by reference to the following detailed description of a preferred embodiment of the present invention when read in conjunction with the accompanying drawing in which like reference characters refer to like parts throughout the views and in which.

DETAILED DESCRIPTION OF A PREFERRED EMBODIMENT OF THE PRESENT INVENTION

Figure 1:
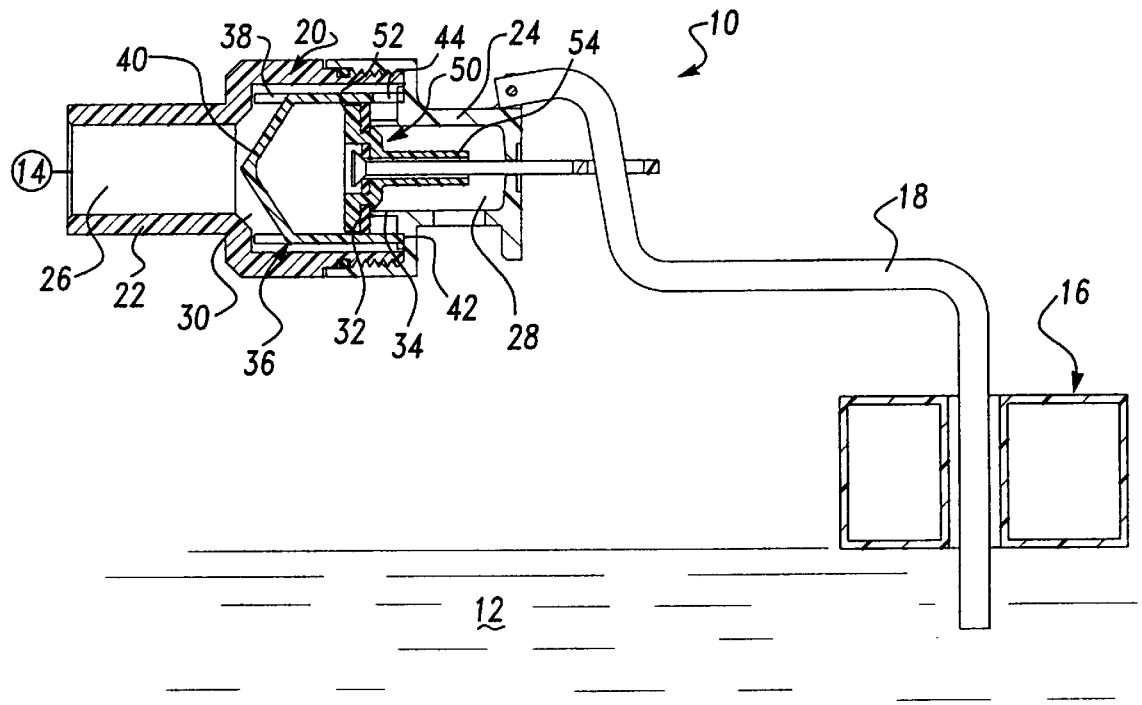
FIG. 1 is a cross-sectional view of a fill valve embodying the present invention with a float in the raised position and the valve closed.
Figure 2:
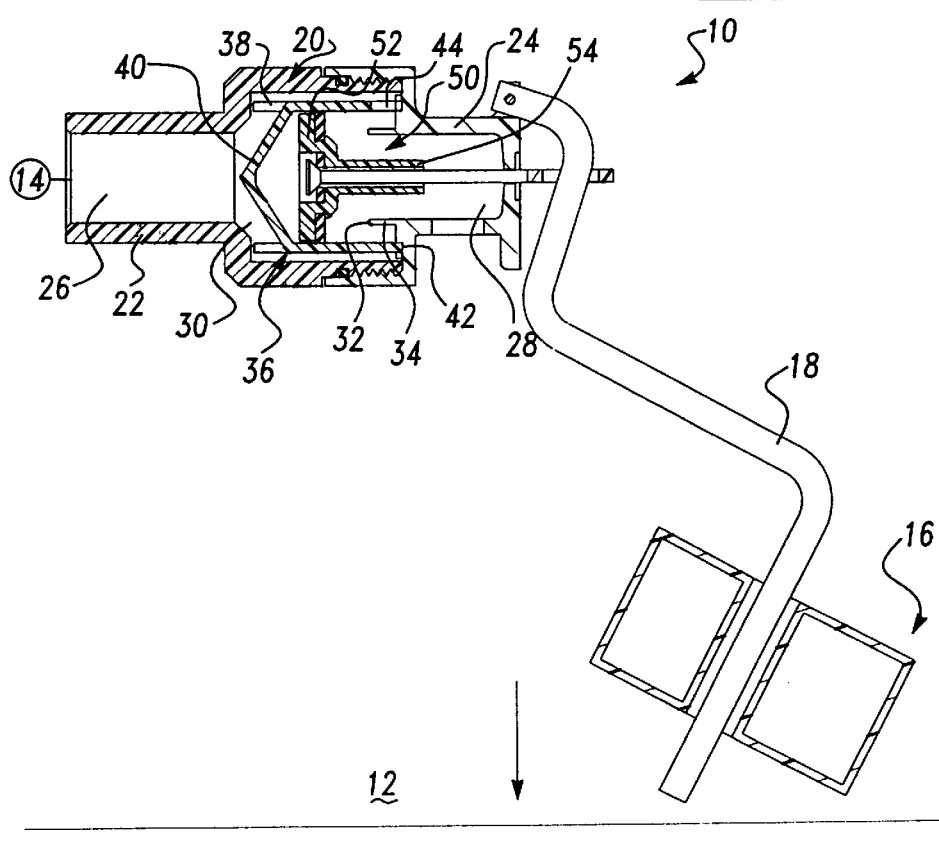
FIG. 2 is a cross-sectional view of the fill valve with the float lowered and the valve in a full open position.

Referring first to FIGS. 1 and 2, there is shown a fill valve 10 embodying the present invention for controlling the filling of a fluid reservoir 12 such as a cistern or other tank. The fill valve 10 is in fluid communication with a fluid supply 14 which may provide continuous or intermittent fluid supply to the valve 10. In accordance with well-known principles, the fill valve 10 is operated by a float 16 mounted to a float arm 18 which moves as the water level varies to control the fill valve 10. FIG. 1 shows the float 16 in a raised shut-off position while FIG. 2 shows the float 16 in a lowered open position. However, operation of the fill valve 10 will be described in greater detail hereinafter.

The fill valve 10 of the present invention includes a housing 20 comprising cooperating first housing portions 22 and second housing portion 24 which respectively include a fluid inlet 26 in communication with the supply 14 and a fluid outlet 28 in communication with the reservoir 12. The housing 20 forms an interior chamber 30 within which the valve assembly is disposed. The interior chamber 30 includes a valve seat 32. In a preferred embodiment, the valve seat 32 is formed by an annular flange 34 connecting with the fluid outlet 28 of the housing 20.

An enclosure 36 is disposed within the interior chamber 30. The enclosure 36 includes legs 38 to maintain the position of enclosure 36 within the interior chamber 30. The enclosure 36 includes a conical first end 40 to direct fluid flow past the enclosure 36 and an open second end 42 to receive the valving components. Proximate the second end 42 are a plurality of ports 44 to allow fluid flow into the enclosure 36 in accordance with the present invention. At least one longitudinal groove 46 is formed on the interior surface of the enclosure 36 to allow seepage past the valve assembly 50 as will be subsequently described.

The valve assembly 50 is reciprocally disposed within the enclosure 36 and housing 20 to control the flow of fluid through the valve 10. The valve assembly 50 includes a valve head 52 which selectively seals against the valve seat 32 to prevent fluid flow to the outlet 28. The valve head 52 has an elongated nose 54 in order to alter the surface area affected by fluid pressure within the housing 20. An outer seal ring 56 is carried by the valve head 52 to seal against the seat 32 and an inner seal ring 58 is carried proximate the axis of the valve head 52. The valve head 52 including the elongated nose 54 has an axial throughbore 60 which receives a valve stem 62. The valve stem 62 includes a stem head 64 and an elongated body 66 which is mechanically connected to the float arm 18. The stem head 64 is configured to selectively sealingly cooperate with the inner seal ring 58 of the valve head 52.

Operation of the fill valve 10 controls filling of the reservoir 12 facilitating full fluid flow until the reservoir 12 is nearly full then providing instantaneous shutoff of the valve 10. In addition, the enclosure 36 acts as a screen reducing large debris which may eventually clog the valve 10 or reduce its efficiency. The valve 10 operates through the stages shown in the drawing figures to first prevent flow to the reservoir 12, control filling of the reservoir 12, and shut off the valve 10 once the fluid level has reached a predetermined level.

Figure 3:
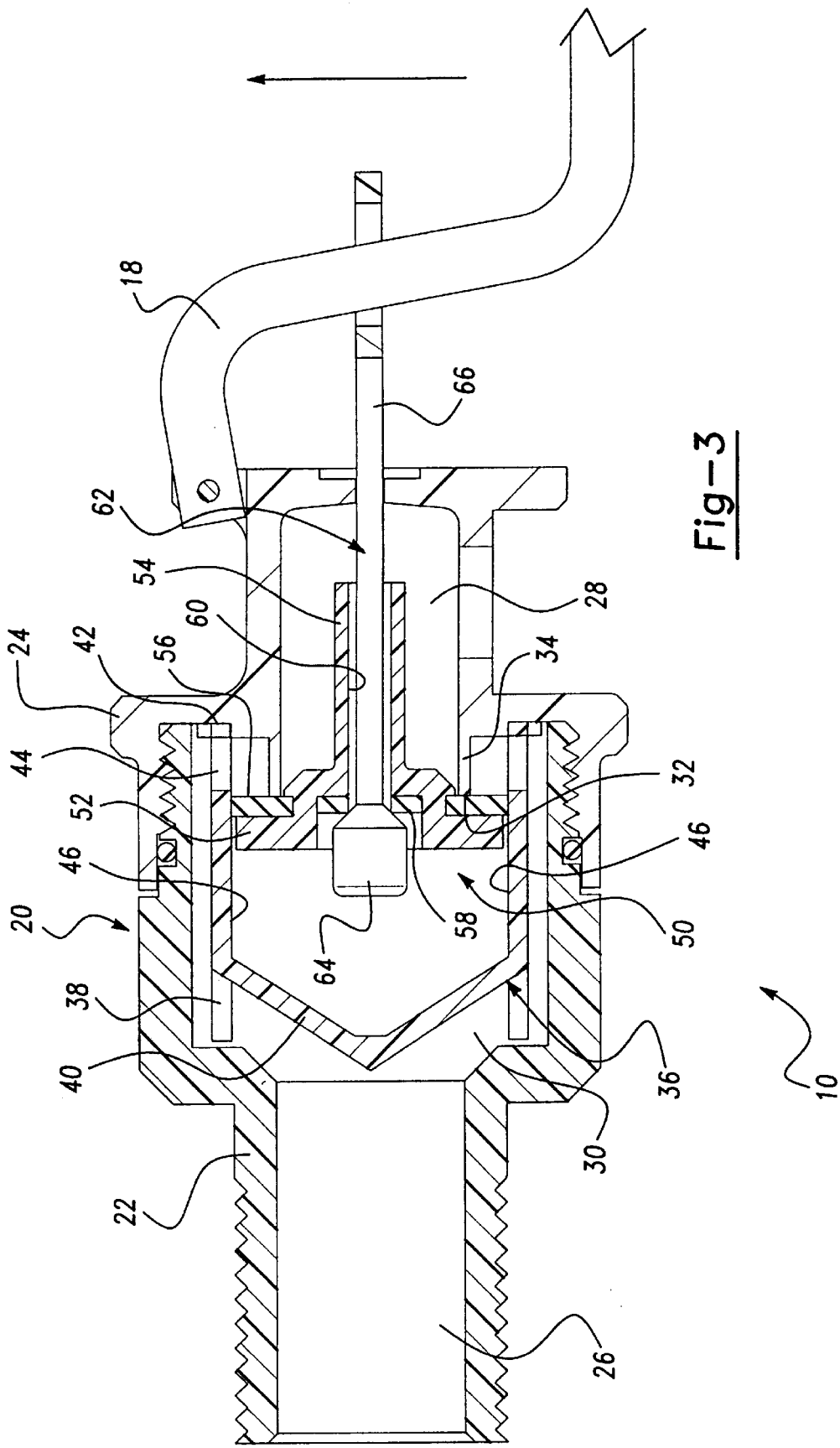
FIG. 3 is an enlarged cross-sectional view of the valve in the closed position.

The valve 10 is shown closed in FIG. 3 preventing flow through the housing 20 to the fluid outlet 28 and the reservoir. The float 16 and arm 18 are raised. The valve stem 62, connected to the float arm 18, is prevented from retracting into the interior chamber 31 thereby maintaining the valve head 52 against the seat 32. Flow through the ports 44 of the enclosure 36 and past the valve seat 32 is blocked by the valve head 52 (FIG. 3). The longitudinal grooves 46 formed in the interior surface of the enclosure 36 allow fluid seepage past the valve head 52 into the interior chamber 31 upstream of the valve head 52. This produces a pressure behind the valve head 52 keeping the valve shut. Because the surface area of the valve head 52 acted upon by the back pressure on the upstream side of the valve head 52 is greater than the surface area outside of the annular flange 34 of the valve seat 32, this back pressure will tend to maintain the valve head 52 sealed against the seat 32. The outer seal ring 56 also acts as a wiper removing any debris which may clog the grooves 46 as the valve head 52 moves within the enclosure 36.

Figure 4:
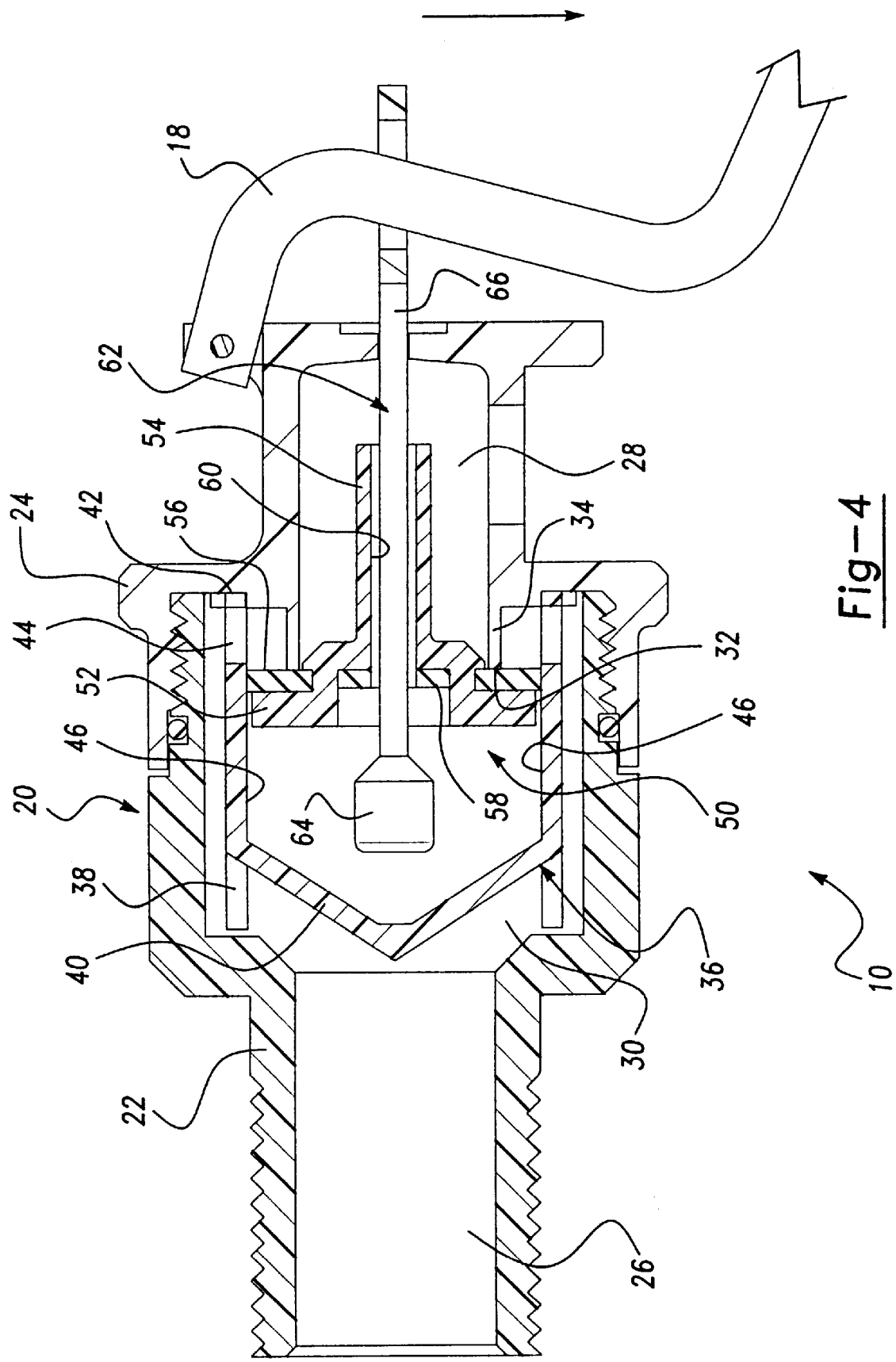
FIG. 4 is an enlarged cross-sectional view of the float arm down and the valve in an intermediate open position.
Figure 5:
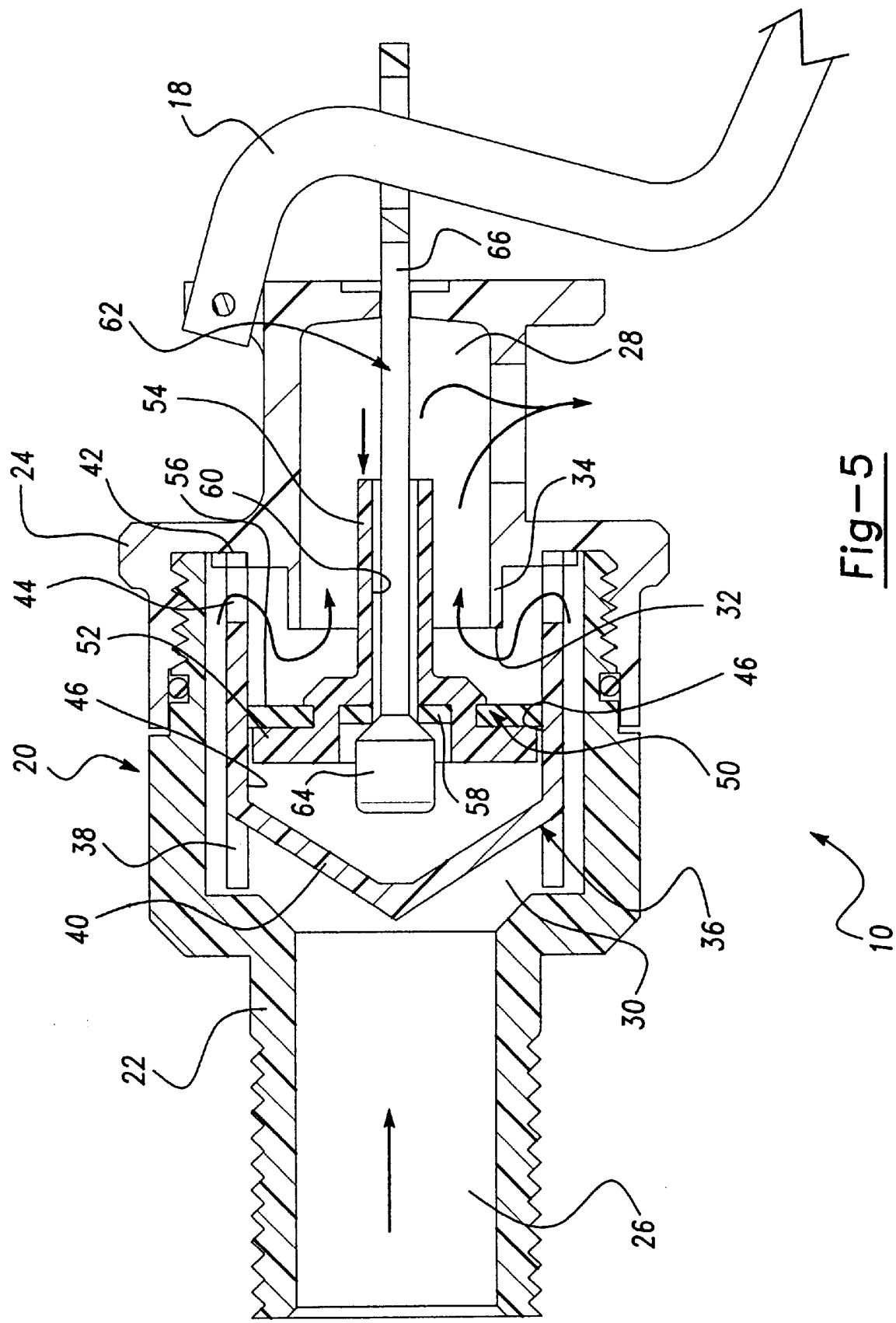
FIG. 5 is an enlarged cross-sectional view of the valve in the full open position.
Figure 6:
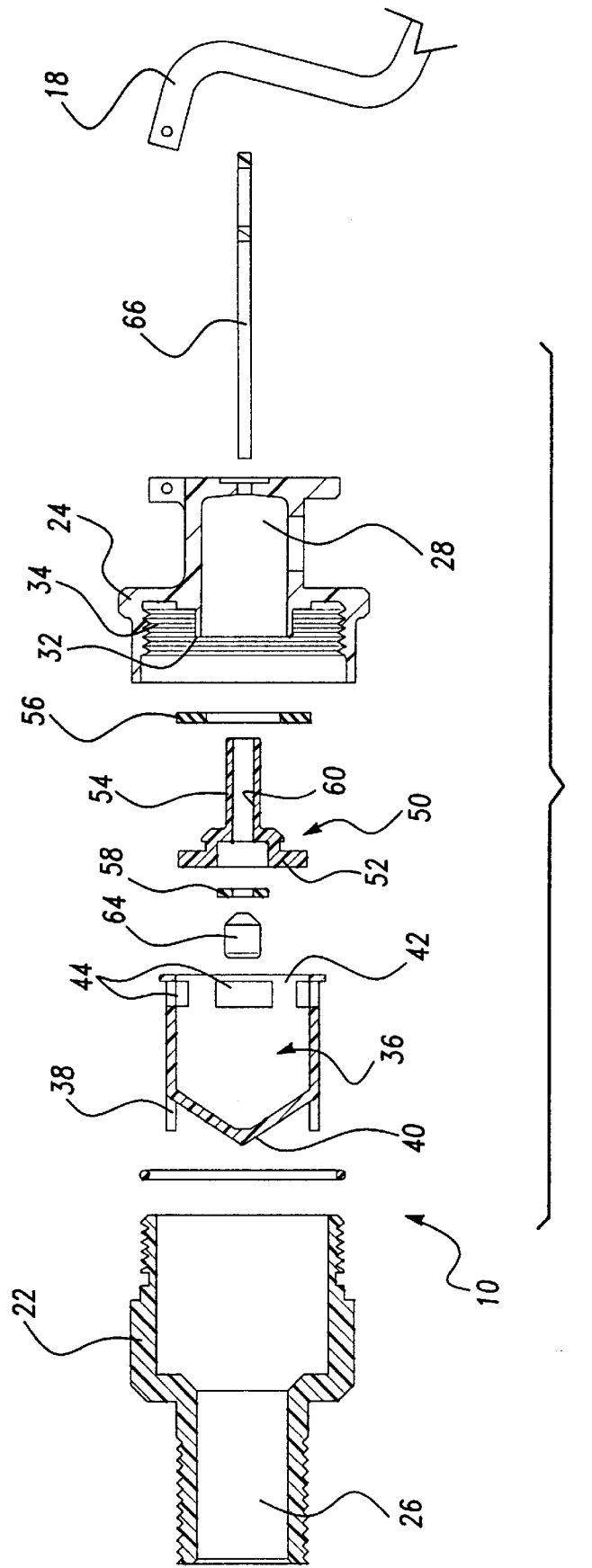
FIG. 6 is an exploded view of the fill valve.

As fluid in the reservoir 12 is used, the level will drop causing the float 16 to move downwardly and the float arm 18 to pivot downwardly (FIG. 4). As the float arm 18 pivots downwardly, the valve stem 62 will move towards the valve inlet 26 away from valve head 52. Movement of the stem head 64 away from the valve head 52 will open the axial throughbore 60 relieving back pressure behind the valve head 52. The fluid pressure through the ports 44 of the enclosure 36 will now be sufficient to push the valve head 52 away from the valve seat (FIG. 5) permitting full flow of fluid through the valve 10 into the reservoir 12. The longitudinal grooves 46 will continue to allow seepage of water to the upstream side of the valve head 52. The configuration of the valve head 52 including the elongated nose 54 alters the downstream fluid pressure applied to the valve head 52 in comparison to the fluid pressure behind the valve head 52. This is particularly applicable to the fluid passing over the annular flange 34 which applies pressure to a relatively small proportion of the downstream side of the valve head 52.

The full fluid flow through the pilot flow valve 10 will reduce the fill time for the reservoir 12 since the valve head 52 is maintained open until the reservoir 12 is filled. This is in contrast to known fill valves which gradually shut off extending the time needed to fill the reservoir as flow dwindles to a trickle through the valve. As the float arm 18 pivots upwardly, the stem head 64 will be drawn against the valve head 52 closing the axial throughbore 60. Seepage through the longitudinal grooves 46 to the upstream side of the valve head 52 will build up fluid pressure. The float arm 18 will not completely draw the valve head 52 against the valve seat 32 but rather permits its movement toward the valve seat 32 once the fluid pressure against the upstream side of the valve head 52 is greater than the pressure on the outlet side of the valve head 52. The pressure applied to the valve head 52 is controlled through the configuration of the valve head 52 particularly on the downstream side where less surface area is directly affected by the fluid pressure in comparison to the relatively continuous upstream side of the valve head 52. Once the fluid pressure within the enclosure overcomes the fluid pressure acting on the outlet side of the valve head 52, the valve head 52 will be pushed against the valve seat 32 instantaneously shutting off fluid flow from a nearly full flow. The float 16 and float arm 18 will be in their raised position and the stem head 64 will be sealed against the valve head 52.

An added feature of the float assembly is an extended tail 19 of the float arm 18 which extends a significant distance over the housing 20. This added length retards reverse pivoting of the float arm 18 during adjustment of the float 16. Upward tension applied to the float arm 18 will be applied to the stem pin 66. If sufficient tension is applied to stem 66, the stem 66 may be pulled from the head 64 causing the valve to fall apart. The float arm tail 19 engages the top of the housing 20 preventing excessive tension on the stem pin 66.

The foregoing detailed description has been given for clearness of understanding only and no unnecessary limitations should be understood therefrom as some modifications will be obvious to those skilled in the art without departing from the scope and spirit of the appended claims.

What is claimed is:

1. A fill valve comprising:

a housing having a valve seat;

float means for vertical movement;

actuator means connected at one end to said float means and pivotally connected at the other end to said housing;

a valve assembly movably mounted in said housing and being seated on said valve seat in a closed position, said valve assembly including a valve head selectively engageable with said valve seat to control fluid flow past said valve assembly and a valve assembly and a valve stem axially disposed within said valve head, said valve head having an outer periphery and said valve stem having a first end and a second end, said first end selectively engaging said valve head and said second end being connected to said actuator means; and an enclosure disposed within said housing and enclosing said valve assembly, said valve head reciprocally movable within said enclosure as said outer periphery engages an interior surface of said enclosure, said interior surface of said enclosure having at least one longitudinal groove for directing fluid flow past said valve head to create a fluid pressure behind said valve head to maintain said valve head in a closed position;

wherein upon vertical downward movement of said float, said actuator means engages said second end of said valve stem and pushes it inwardly into said housing such that said first end of said valve stem disengages said valve head and releases said fluid pressure within said enclosure behind said valve head thereby facilitating movement of said valve head off of said valve seat and opening said fill valve.

2. The valve of claim 1 wherein said valve stem has an aperture extending therethrough adjacent said second end.

3. The valve of claim 2 wherein said aperture of said valve stem has a first wall and a second wall, said actuator means extending through said aperture, said aperture having a diameter substantially greater than said actuator means such that said actuator means travels within said aperture upon movement of said float means prior to engaging said first or second wall of said valve stem.

4. The valve of claim 3 wherein upon downward movement of said float said actuator means engages said first wall and moves said stem to an open position.

5. The valve of claim 3 wherein upon upward movement of said float said actuator means engages said second wall and moves said stem, with said valve head, to the closed position.

6. The valve as defined in claim 1 wherein said valve head includes an axial throughbore, said first end of said valve stem selectively sealing said throughbore of said valve head to selectively prevent fluid flow through the valve head.

7. The valve as defined in claim 6 wherein said valve head includes a nose portion extending toward an outlet end of said housing, said axial throughbore extending through said nose portion.

8. The valve as defined in claim 1 wherein said enclosure means includes means for directing fluid past said valve head to selectively increase fluid pressure behind said valve head urging said valve head towards said valve seat.

9. The valve as defined in claim 8 wherein said enclosure means includes an enclosure disposed within said housing and having at least one fluid port, said valve head sealingly engaging an interior surface of said enclosure.

10. A fill valve for controlling the selective filling of a fluid reservoir, said valve comprising:

a housing having a fluid inlet, a fluid outlet, a chamber disposed between said inlet and outlet and a valve seat formed within said housing;

float means for detecting fluid levels within the reservoir, said float means including an actuator arm pivotably connected to said housing;

an enclosure disposed within said chamber for directing flow across said valve seat, said enclosure having an interior surface with at least one longitudinal groove;

a valve assembly movably disposed within said enclosure between an open position and a closed position seated on said valve seat, said valve assembly including a valve head and a valve stem having a first end and a second end, said first end of said valve stem engaging said valve head and said second end of said valve stem selectively engaging said actuator arm of said float means, said valve head having a peripheral edge sealingly engaging said interior surface of said enclosure and said at least one longitudinal groove directing fluid flow past said valve head into said enclosure forming a fluid back pressure on an upstream side of said valve head to move said valve head towards a closed position against said valve seat; and pilot means selectively allowing fluid flow through said valve head, said pilot means including an axial throughbore formed in said valve head, said first end of said valve stem including a stem head for selectively sealing said throughbore of said valve head, said stem head disengaging said valve head upon movement of said float means to an operating position thereby opening said axial throughbore and releasing said fluid back pressure within said enclosure behind said valve head to facilitate movement of said valve head off of said valve seat to open said fill valve.

11. The valve as defined in claim 10 wherein said enclosure includes a plurality of fluid ports upstream of said valve seat for directing fluid flow against said valve head disposed within said enclosure, upon opening of said valve assembly, said fluid flowing through said fluid ports and through said valve seat to said outlet of said valve.

12. The valve as defined in claim 10 wherein said valve head includes a nose portion extending toward said outlet of said housing, said axial throughbore extending through said nose portion.

13. The valve as defined in claim 12 wherein said second end of said valve stem includes loop means engaging said actuator arm such that movement of said actuator arm urges said valve stem between a first and second position.

14. A fill valve for controlling the selective filling of a fluid reservoir, said valve comprising:

a housing having a fluid inlet, a fluid outlet, a chamber disposed between said inlet and outlet and a valve seat formed within said housing;

float means for detecting fluid levels within the reservoir, said float means including an actuator arm connected to said housing;

an enclosure disposed within said chamber for directing fluid flow across said valve seat, said enclosure having an interior surface with at least one longitudinal groove;

a valve assembly movably disposed within said enclosure between an open position and a closed position seated on said valve seat, said valve assembly including a valve head with an axial throughbore forming pilot means selectively allowing fluid flow through said valve head and a valve stem movably disposed in said axial throughbore, said valve stem having a first end selectively engageable with said valve head to prevent fluid flow through said throughbore and a second end connected to said actuator arm of said float means, a peripheral edge of said valve head sealingly engaging said interior surface of said enclosure and said at least one longitudinal groove directing fluid flow past said peripheral edge of said valve head into said enclosure forming a fluid back pressure on an upstream side of said valve head to move said valve head towards a closed position against said valve seat, said peripheral edge of said valve head wiping debris from said at least one longitudinal groove during reciprocal movement of said valve head within said enclosure;

said second end of said valve stem including loop means selectively engaging said actuator arm such that movement of said actuator arm engages said value stem at a predetermined position to urge said valve stem between a first and a second position releasing said fluid back pressure within said enclosure behind said valve head to facilitate movement of said valve head off of said valve seat to open said fill valve.

15. The valve as defined in claim 14 wherein said enclosure includes a plurality of fluid ports upstream of said valve seat for directing fluid flow against said valve head disposed within said enclosure.

16. The valve as defined in claim 14 wherein said loop means includes a lost motion portion such that said actuator arm does not engage said valve stem facilitating movement of said valve stem independently of said actuator arm.

* * * * *